United States Patent [19]
Bartucci et al.

[11] Patent Number: 5,208,859
[45] Date of Patent: May 4, 1993

[54] METHOD FOR REKEYING SECURE COMMUNICATION UNITS BY GROUP

[75] Inventors: John T. Bartucci; Kevin M. Cutts, both of Schaumburg; Jeffrey J. Brzozowski, Arlington Heights, all of Ill.

[73] Assignee: Motorola, Inc., Schaumburg, Ill.

[21] Appl. No.: 670,553

[22] Filed: Mar. 15, 1991

[51] Int. Cl.$^5$ .............................................. H04L 9/02
[52] U.S. Cl. ...................................... 380/45; 380/21; 380/47
[58] Field of Search .............................. 380/21, 45, 47

[56] References Cited
U.S. PATENT DOCUMENTS

| | | | |
|---|---|---|---|
| 4,688,250 | 8/1987 | Corrington et al. | 380/23 |
| 4,944,008 | 7/1990 | Piosenka et al. | 380/46 |
| 4,993,067 | 2/1991 | Leopold | 380/21 |
| 4,993,069 | 2/1991 | Matyas et al. | 380/45 |

Primary Examiner—Stephen C. Buczinski
Attorney, Agent, or Firm—John W. Hayes

[57] ABSTRACT

A method for storing and managing rekeying information for a secure communication system, as well as for carrying out a rekeying operation. Encryption key variables stored in memory (301) are represented by mnemonics (303) as part of an editable data base (302) that is arranged in the same order as communication unit key storage locations. Each communication unit (305) within the system is assigned to a specific group (304), while each group (304) is assigned to a particular editable data base (302).

5 Claims, 4 Drawing Sheets

METHOD FOR REKEYING SECURE COMMUNICATION UNITS BY GROUP

TECHNICAL FIELD

This invention relates generally to communication systems such as, but not limited to, secure communication systems, and is more particularly directed toward a method for rapidly rekeying a large number of communication units while minimizing risk or compromise.

BACKGROUND OF THE INVENTION

Secure communication systems provide many different categories of users with the capability to exchange sensitive information with little risk of eavesdropping. Because of the complex nature of modern encryption schemes, encrypted communication signals sound like noise to any listener not equipped with a proper decryption device. Long digital sequences called keys are used to encrypt information signals, and proper decryption cannot occur unless the listener is equipped with a decryption device of the same type as that used to encrypt the signals, and containing the same key as that used by the encryption device.

Because of the need for an adversary to learn encryption keys in order to seriously threaten system intergrity, the keys themselves and the way they are managed may be considered the weak link in any secure system. Conscientious system managers change keys in all communication units throughout the system on a regular basis (perhaps as frequently as weekly) in order to forestall possible system compromise. Even though the regular rekeying procedure may be time consuming, there is no particular pressure of time in this rekeying scenario.

Having just one secure communication unit within a system fall into the hands of an adversary, however, creates a greater need for urgency. Secure communication units that are constantly exposed to the hazard of theft (those used by police agencies, for example) do occasionally end up in the wrong hands.

When in the possession of a skilled adversary, it is always possible that a stolen communication unit may be analyzed, despite built-in safeguards, to discover information about encryption keys in use and about the structure of the key management system itself. When theft of a particular unit is discovered, it is imperative that the keys in the stolen unit not be used for encryption from that point forward. Because of the group structures often employed in large systems (designed, for example, to permit tactical units to communicate with investigative units within law enforcement agencies) numerous units may have to be rekeyed in order to allow full communication capability to be restored. In addition, if an adversary were to obtain more than one communication unit, an examination of the keys stored in the unit might reveal important group relationships.

Accordingly, a need arises for a method for rekeying a large number of communication units in the field in the shortest possible time, while allowing rapid reorganization of the key assignment plan.

SUMMARY OF THE INVENTION

This need and others are satisfied by the method of the present invention, which, for a secure communication system including a plurality of communication units and a central processing resource, provides the capability for storing and managing rekeying information. The method includes the steps of storing communication unit identification information within the central processing resource, storing encryption keys associated with the communication units within the central processing resource and maintaining a plurality of editable data bases that establish a one-to-one correspondence between the encryption keys and key storage locations within the communication units. Each communication unit is assigned to one of a number of predetermined groups, and each group is assigned to one of the editable date bases.

DESCRIPTION OF A PREFERRED EMBODIMENT

Figure 1:
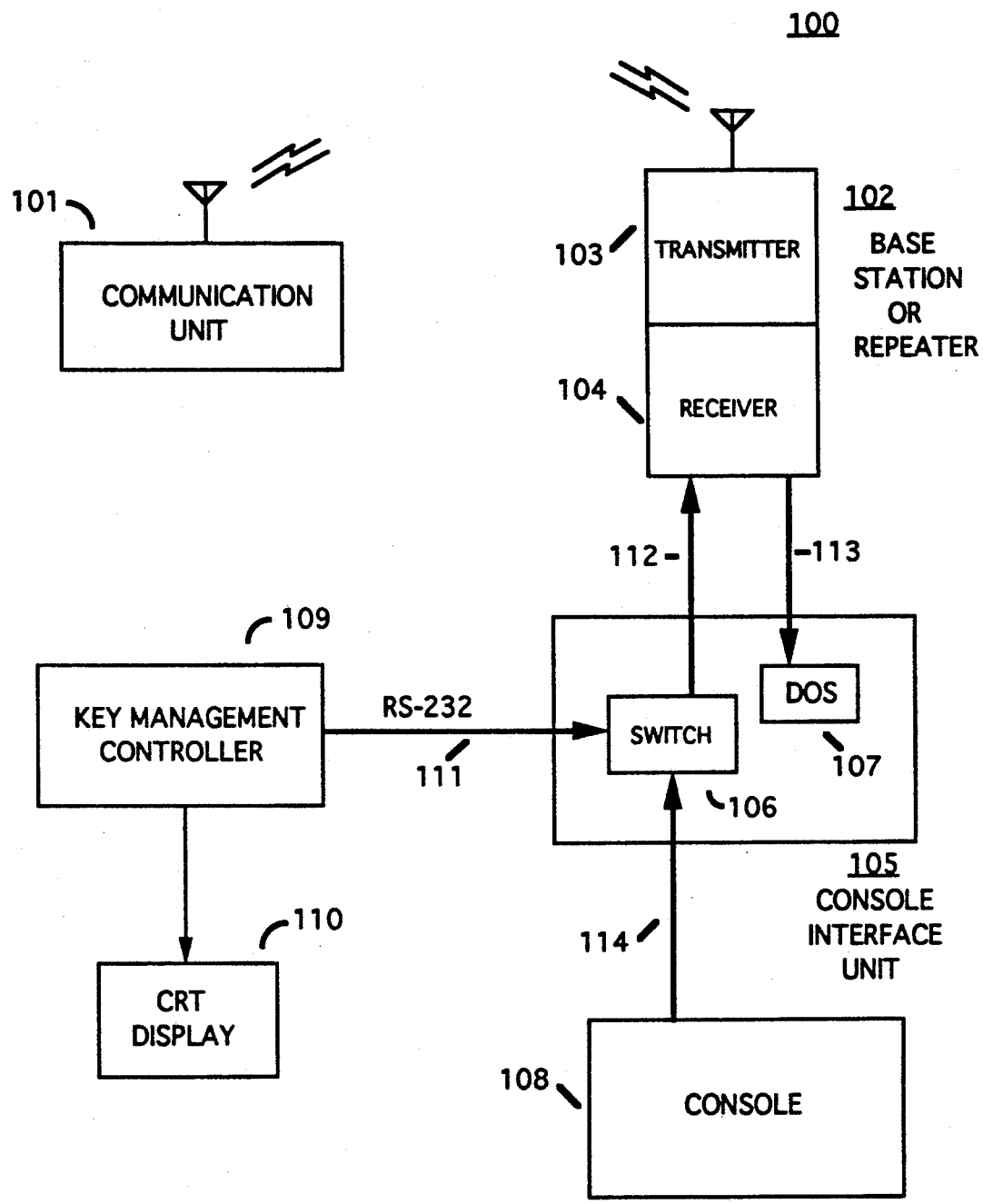
FIG. 1 is a block diagram of a secure communication system.

FIG. 1 is a block diagram of a secure communication system as generally depicted by the numeral 100. The system includes a plurality of communication units (101), although only one is shown on the figure for the sake of simplicity The communication units (101) may be portable units, mobile units, or even fixed units.

The communication units (101) communicate with one another (and often with a central site) using RF (radio frequency) communication resources, which may be individual frequencies, pairs of RF frequencies (in the case of full-duplex communication) or time slots in a time-division multiplexed (TDM) system.

Generally, the central site is a base station or repeater (102) having both transmitter (103) and receiver (104) portions. The base station is coupled to an operator's console (108) through a console interface unit or CIU (105).

The operator's console (108), as is well-known in the art, is typically a control center having multiple operating positions, each with the capability to select communication resources and communicate with communication units within the system. The console interface unit (105) provides the necessary interface between the console and base station. In secure communication systems, the CIU (105) houses the encryption and decryption devices for voice signals.

The CIU also provides an interface to a key management controller of KMC (109). The KMC provides data storage and manipulation capabilities necessary for proper operation of the system, and will be discussed in more detail below. Typically, the KMC (109) is a computer system having fairly sophisticated computational capability. In the preferred embodiment, the KMC (109) is based upon a 68030 microprocessor, manufactured by Motorola, Inc. The KMC (109) is coupled to an associated cathode ray tube (CRT) display (110).

The KMC (109) interface to the CIU (105) is an RS-232 interface (111). A switch (106) internal to the CIU (105) determines whether signals from the KMC (109) or the console (108) will be applied to the transmitter section (103) of the base station (102). Signals originating from the console (108) are coupled to the CIU over a dedicated line (114) to the switch (106). Whether the switch (106) selects console (108) or KMC (109) signals, the switch (106) output is applied to the base station transmitter (103) through an interconnecting data path (112).

Signals originating from the KMC (109) are generally rekeying information transmitted in a coded format. Although any code would suffice, in the preferred embodiment MDC-1200, developed by Motorola, Inc., is used. Since it is intended that communication units (101) receiving rekeying information have the opportunity for authentication and/or acknowledgement, the CIU (105) includes a data operated switch (DOS) that can detect MDC1200 transmissions from communication units (101) and direct these signals to the KMC (109). Signals from the base station receiver portion (104) are coupled to the DOS (107) over a separate data path (113).

Figure 2:
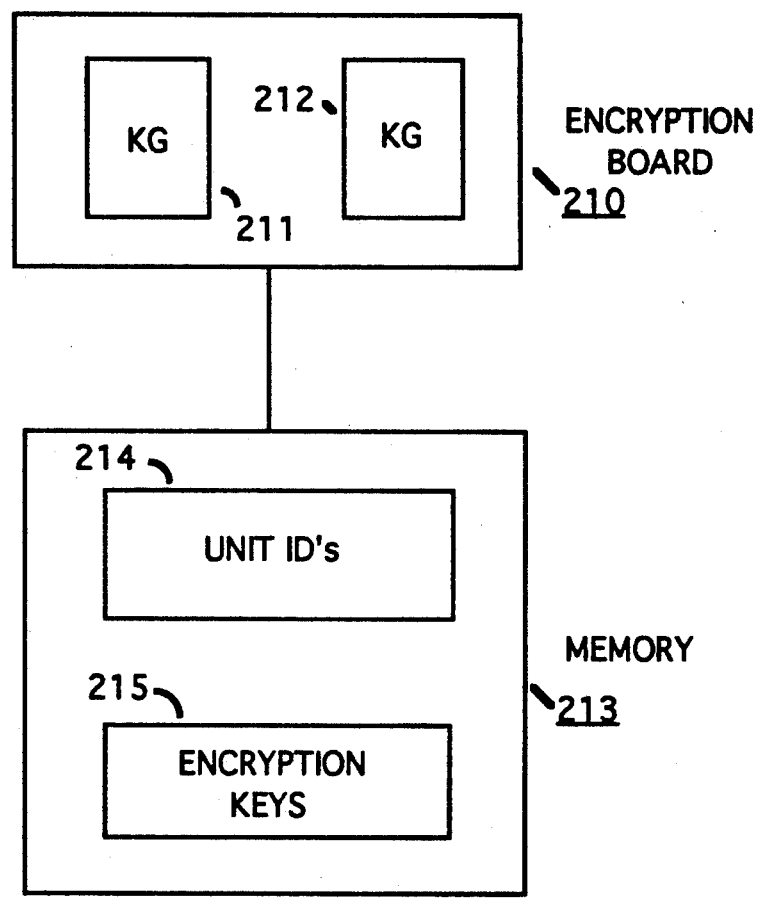
FIG. 2 illustrates some of the elements internal to a key management controller.

FIG. 2 illustrates some of the internal components of the KMC (109). Since it is a primary KMC (109) function to maintain a data base of communication unit ID's (identification information), the KMC (109) includes a memory (213) with ample capacity to store both communication unit ID's (214) and associated encryption keys (215). For security purposes, encryption key information (215) stored in the KMC (109) is encrypted by one of the key generators (KG's) (211) on a separate encryption board (210) that is part of the KMC (109). Key generator is simply another term used in the art that is often applied to an encryption or decryption device. Prior to transmission to a communication unit, encryption key variables are encrypted by a separate KG (212).

Assuming that a communication unit were stolen and subjected to analysis by an adversary, the adversary may discover not only the encryption keys but the key encryption keys (sometimes called shadow keys) as well. A key encryption key or shadow key is an encryption key used to encrypt new encryption keys before transmission. Sending new encryption keys in the clear (unencrypted) would be a violation of system security. Each communication unit stores two shadow keys, one that is common to all units and one that is unique to each unit.

If the common shadow key were discovered by the adversary during his examination of the stolen unit, any rekeying operation using the common shadow key would be a serious compromise of system security. On the other hand, rekeying all units one at a time using each unit's unique shadow key would be extremely time consuming.

Figure 3:
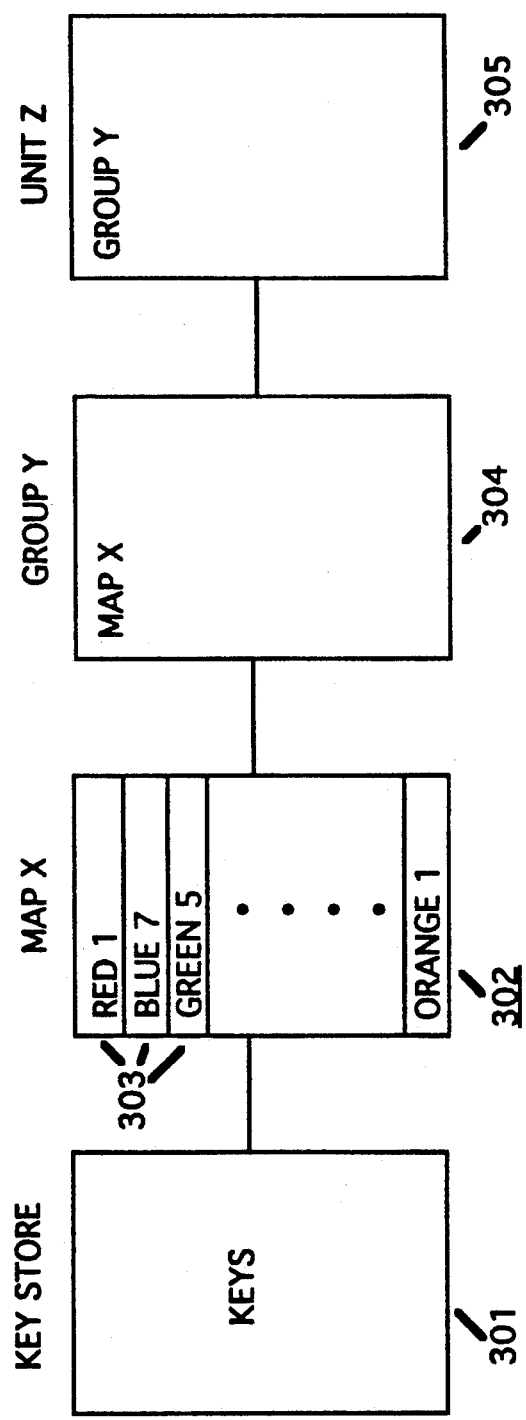
FIG. 3 depicts the relationships among encryption key variables, mnemonics, communication units, and groups.

The memory within the KMC (109) is organized to support rekeying operations in the most efficient way, while keeping in mind user-friendliness requirements. FIG. 3 illustrates symbolically the way in which key variable information is structured.

Keys from the key storage memory (301) are arranged in editable data bases called maps (302). Each map is simply an arrangement of keys in the order in which they would be stored in a communication unit. In the preferred embodiment, each map can accommodate 1024 keys, since this in the number of keys that a CIU can hold. Another CIU may be rekeyed by the KMC in exactly the same fashion as any other communication unit. Of course, mobile and portable units have a smaller storage capability than a CIU, so the map size could be much smaller if only mobile and portable units were involved.

Figure 4:
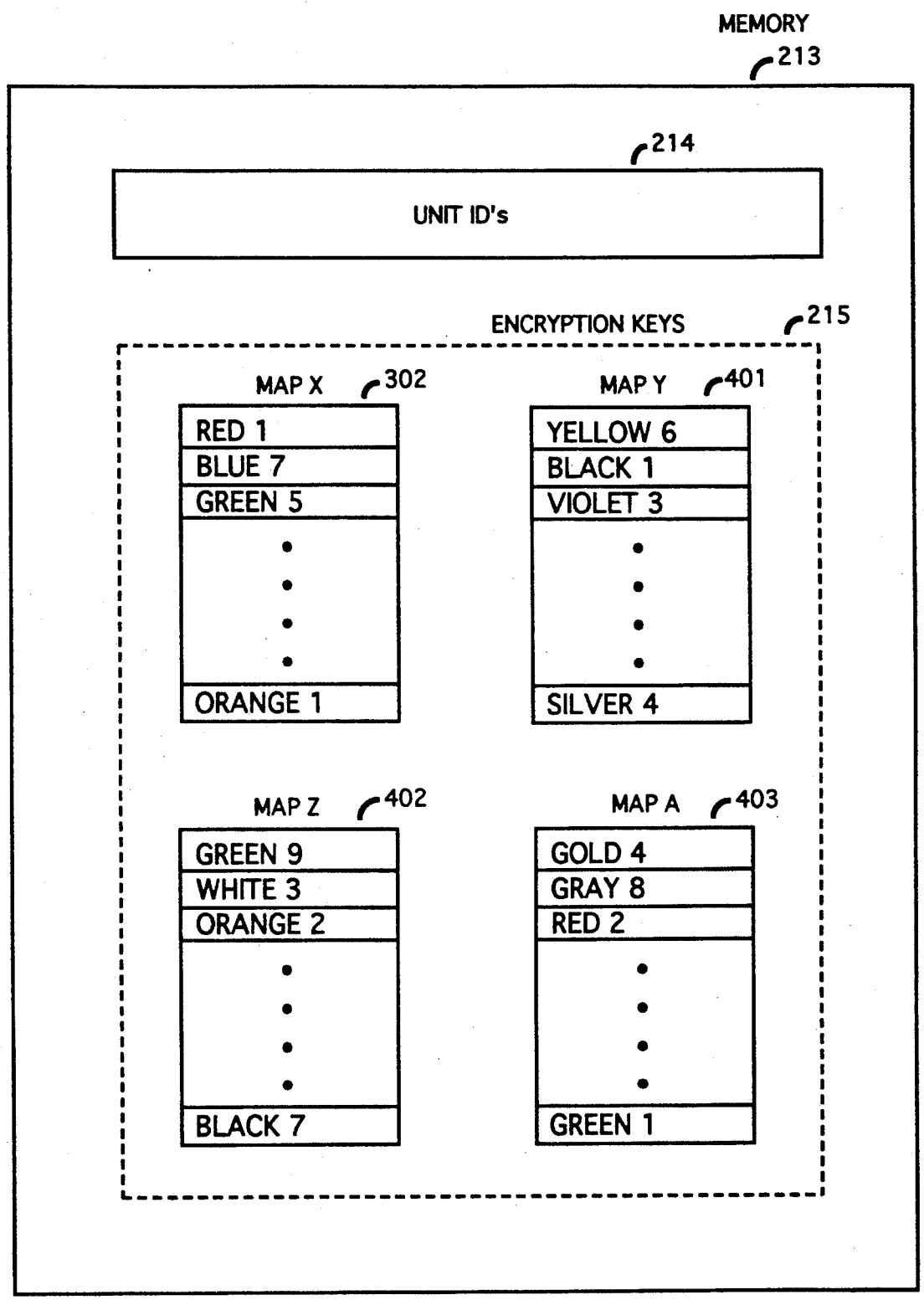
FIG. 4 illustrates encryption keys arranged in maps within the encryption key memory of the key management controller.

Since it is convenient for system managers and operators, the map relationship is structured in terms of key variable mnemonic names (303). These mnemonics are much shorter than the long binary sequences that comprise actual key variables, and are much easier for the operator to remember and manipulate. A typical mnemonic, RED 1, identifies the key (RED) and the version (1). FIG. 4 provides a physical depiction of encryption key storage as opposed to the symbolic representation of FIG. 3. As described in conjunction with FIG. 2 above, the memory (213) of the key management controller (109) is structured to accommodate both communication unit ID's (214) and associated encryption keys (215). The encryption keys are arranged in the memory (213) in maps (302, 401-403). Each map, as discussed above, is an arrangement of keys in the order in which they would be stored in a communication unit.

Each communication unit (305) within the system is assigned to a group (304), while each group is assigned to a map (302). Under this organization, if a communication unit were stolen and all remaining units had to be rekeyed, the number of rekey transmissions would approximate the number of groups, rather than the number of units.

For maximum effectiveness, the optimum number of groups may be computed by assuming that one of a number N of communication units has been stolen and the remaining $N-1$ must be rekeyed. The number of rekeys required could then be expressed as:

$$REKEYS + M - 1 + N/M - 1$$

Differentiating this expression and setting the result equal to zero, in a manner well-known for minimization, the optimum number of groups is found to be the square root of the number of units.

Since, under the method of the present invention, an optimum number of groups has been found, each group is assigned a common shadow key that is different from the common shadow key assigned to any other group. Of course, each individual unit would still retain its unique shadow key. Under the stolen unit scenario described above, only the common shadow key belonging to the group to which the stolen unit belongs has been compromised. Thus, group rekeying may be conducted for all other groups, with individual unit rekeying being required only for the units in the group of which the stolen unit was a part.

What is claimed is:

1. In a secure communication system including a plurality of communication units and a key management controller, a method for storing and managing rekeying information, the method comprising:
    (a) storing communication unit identification information within the key management controller;
    (b) storing encryption keys associated with the communication units within the key management controller;
    (c) maintaining a plurality of editable data bases that establish a one-to-one correspondence between the encryption keys and key storage locations within the communication units;
    (d) assigning each communication unit to one of a number of predetermined groups; and
    (e) assigning each group to one of the editable data bases.

2. The method in accordance with claim 1, wherein each of said editable data bases in an arrangement of encryption key mnemonics.

3. The method in accordance with claim 1, wherein the number of predetermined groups is approximately equal to the square root of the number of communication units.

4. In a secure communication system including a plurality of communication units and a key management controller, a method for rekeying the communication units, the method comprising:
(a) storing communication unit identification information with the key management controller;
(b) storing encryption keys associated with the communication units within the key management controller;
(c) maintaining a plurality of editable data bases that establish a one-to-one correspondence between the encryption keys and key storage locations within the communication units;
(d) assigning each communication unit to one of a number of predetermined groups;
(e) assigning each group to one of the editable data bases; and
(f) transmitting new encryption keys to the communication units within each predetermined group by extracting the encryption keys from the editable data base to which each group has been assigned.

5. For a secure communication system including a plurality of communication units and a key management controller, an apparatus for rekeying the communication units, the apparatus comprising:
means for storing communication unit identification information within the key management controller;
means for storing encryption keys associated with the communication units within the key management controller;
means for maintaining a plurality of editable data bases that establish a one-to-one correspondence between the encryption keys and key storage locations within the communication units;
means for assigning each communication unit to one of a number of predetermined groups;
means for assigning each group to one of the editable data bases;
means for transmitting new encryption keys to the communication units within each predetermined group by extracting the encryption keys from the editable data base to which each group has been assigned.

* * * * *